US007487263B2

(12) United States Patent
Chopping et al.

(10) Patent No.: US 7,487,263 B2
(45) Date of Patent: *Feb. 3, 2009

(54) PARTIALLY INTERCONNECTED NETWORKS

(75) Inventors: Geoffrey Chopping, Wimborne (GB); Richard John Proctor, Wimborne (GB)

(73) Assignee: Ericsson AB, Stockholm (SE)

( * ) Notice: Subject to any disclaimer, the term of this patent is extended or adjusted under 35 U.S.C. 154(b) by 436 days.

This patent is subject to a terminal disclaimer.

(21) Appl. No.: 10/470,204

(22) PCT Filed: Jan. 14, 2002
(Under 37 CFR 1.47)

(86) PCT No.: PCT/GB02/00145

§ 371 (c)(1),
(2), (4) Date: Mar. 26, 2004

(87) PCT Pub. No.: WO02/062080

PCT Pub. Date: Aug. 8, 2002

(65) Prior Publication Data

US 2005/0080836 A1      Apr. 14, 2005

(30) Foreign Application Priority Data

Jan. 30, 2001    (GB)    ................................. 0102349.8

(51) Int. Cl.
 *G06F 15/16*    (2006.01)
(52) U.S. Cl. ...................................................... 709/249
(58) Field of Classification Search ......... 709/220–222, 709/238–239, 249–252; 370/254, 400–408
See application file for complete search history.

(56) References Cited

U.S. PATENT DOCUMENTS 6,339,488 B1 *    1/2002    Beshai et al. .................. 398/59

(Continued)

FOREIGN PATENT DOCUMENTS

EP    0 851 693 A1    12/1997

(Continued)

OTHER PUBLICATIONS

Seigneur, W.F., The Robust Open Architecture Distributed Switching Model: Building the Network Operating System for the Information Superhighway, 1996 Annual Review of Communications, vol. 49, pp. 637-651.

*Primary Examiner*—Salad Abdullahi
(74) *Attorney, Agent, or Firm*—Kirschstein, et al.

(57) ABSTRACT

A partially interconnected network has a plurality of topological nodes, each of the topological nodes having at least three direct point-to-point topological links connected to other topological nodes. Each of a proportion of the plurality of topological nodes is connected to one of a group of point-of-presence (PoP) units. The group of PoP units is arranged to provide access to a selected service or services, one or more of each of the at least three direct point-to-point topological links from each topological node not being connected to one of a group of PoP units connecting to one or more than one of the plurality of topological nodes being connected to one of the group of PoP units. There is at least one choice of routing between any two topological nodes, the choice of routing being either via two topological links connected in series at another topological node or a direct point-to-point topological link between the two topological nodes.

4 Claims, 21 Drawing Sheets

U.S. PATENT DOCUMENTS

| | | | |
|---|---|---|---|
| 6,542,511 B1 * | 4/2003 | Livermore et al. | 370/406 |
| 6,584,073 B1 * | 6/2003 | Steele et al. | 370/254 |
| 6,728,214 B1 * | 4/2004 | Hao et al. | 370/241 |
| 6,791,939 B1 * | 9/2004 | Steele et al. | 370/217 |
| 6,909,700 B1 * | 6/2005 | Benmohamed et al. | 370/255 |
| 2002/0143927 A1 * | 10/2002 | Maltz et al. | 709/224 |
| 2006/0153066 A1 * | 7/2006 | Saleh et al. | 370/216 |

FOREIGN PATENT DOCUMENTS

| | | |
|---|---|---|
| WO | WO 00/79806 A1 | 12/2000 |

* cited by examiner

PERFECT SQUARE NETWORKS
at least two patterns can be drawn for each value of N where N is a square

| $v$ $N$ | $k$ $R$ | $\lambda$ $C\lambda$ | $\mu$ $C\mu$ | $C(\lambda+1)$ | $v$ $N$ | $k$ $R$ | $\lambda$ $C\lambda$ | $\mu$ $C\mu$ | $C(\lambda+1)$ |
|---|---|---|---|---|---|---|---|---|---|
| 9 | 4 | 1 | 2 | 2 | 49 | 12 | 5 | 2 | 6 |
| 9 | 6 | 3 | 6 | 4 | 49 | 18 | 7 | 6 | 8 |
| 16 | 6 | 2 | 2 | 3 | 49 | 24 | 11 | 12 | 12 |
| 16 | 9 | 4 | 6 | 5 | 64 | 14 | 6 | 2 | 7 |
| 25 | 8 | 3 | 2 | 4 | 64 | 21 | 8 | 6 | 9 |
| 25 | 12 | 5 | 6 | 6 | 81 | 16 | 7 | 2 | 8 |
| 25 | 16 | 9 | 12 | 10 | 81 | 24 | 9 | 6 | 10 |
| 36 | 10 | 4 | 2 | 5 | 81 | 32 | 13 | 12 | 13 |
| 36 | 15 | 6 | 6 | 7 | 100 | 18 | 8 | 2 | 9 |
|   |   |   |   |   | 100 | 27 | 10 | 6 | 11 |
|   |   |   |   |   |     |    | etc. |  |   |

Figure 10

FURTHER Multiple Choice SRG based on intersecting a number of lines
with $\mu = 4$

| $v$<br>N | $k$<br>R | $\lambda$<br>$C\lambda$ | $\mu$<br>$C\mu$ | $C(\lambda+1)$ |
|---|---|---|---|---|
| 6  | 4  | 2  | 4 | 3  |
| 10 | 6  | 3  | 4 | 4  |
| 15 | 8  | 4  | 4 | 5  |
| 21 | 10 | 5  | 4 | 6  |
| 28 | 12 | 6  | 4 | 7  |
| 36 | 14 | 7  | 4 | 8  |
| 45 | 16 | 8  | 4 | 9  |
| 55 | 18 | 9  | 4 | 10 |
| 66 | 20 | 10 | 4 | 11 | etc.

Figure 20

Some Further Multiple Choice SRGs which are suitable for having PoPs added in a regular fashion;

| $v$ | $k$ | $\lambda$ | $\mu$ | | |
|-----|-----|-----------|-------|---|---|
| N | R | C$\lambda$ | C$\mu$ | C($\lambda$+1) | |
| 45 | 12 | 3 | 3 | 4 | |
| 96 | 20 | 4 | 4 | 5 | |
| 175 | 30 | 5 | 5 | 6 | |

Figure 21

PARTIALLY INTERCONNECTED NETWORKS

The present invention relates to network topologies and in particular Partially Interconnected Network arrangements that are advantageous when connecting each main node to the other main nodes.

Reference is made to Patent Application No. GB2363544A and Patent No. GB2350517B, which are imported herein by way of reference.

In Patent Application No. GB2363544A there is described a partially interconnected topological network which has at least six Topological Nodes, each Topological Node having at least three point-to-point Topological Links connecting it to some but not all of the Topological Nodes, there being at least one Choice of routing between any two Topological Nodes and a Choice of routing is either via two point-to-point Topological Links connected in series at another Topological Node or a direct point-to-point Topological Link between the two Topological Nodes. The topological network is arranged by the application of Strongly Regular Graphs and the application of some symmetric Balanced Incomplete Block Designs.

In Patent No. GB2350517A there is described a partially interconnected network comprising a plurality of Allocated Nodes, which Allocated Nodes are each allocated to one of a number of AREAS, and further comprising a plurality of STAR Nodes (STARs), and also comprising point-to-point interconnections between the Allocated Nodes and the STAR Nodes, where the number of AREAs with Allocated Nodes connected to an individual STAR forms the number of ROUTEs from an individual STAR, the Allocated Nodes of a first of the AREAs being connected to a set comprising some, but not all, of the STAR Nodes, and wherein further of the AREAs are similarly connected to further sets each comprising STAR Nodes and where there is at least one connection choice (CHOICE) between any two Allocated Nodes in different AREAs and where a connection route comprises two point-to-point interconnections connected in series by a STAR Node.

Reference is further made to the simultaneously filed application, Patent Application No. GB010234.8, in which is described a partially interconnected network which comprises a plurality of Allocated Nodes, which Allocated Nodes are each allocated to one of a number of Areas (AREAs), and further comprises a plurality of Star Nodes (STARs) and point-to-point interconnections between the Allocated Nodes and the Star Nodes, where the number of AREAs with Allocated Nodes interconnected to an individual Star forms the number of Routes (ROUTEs) from an individual STAR, each of a proportion of the plurality of Star Nodes having connected thereat one of a group of Point of Presence (PoP) Units, said group of PoP Units being arranged to provide access to a selected service or selected services, the Allocated Nodes of a first of the AREAs being interconnected to a set comprising some, but not all, of the STAR Nodes, and wherein further of the AREAs are similarly interconnected to further sets each comprising STAR Nodes, one, or more than one, of the direct point-to-point interconnections from each Allocated Node connecting to one, or more than one, of the plurality of Star Nodes having connected thereat one of the group of PoP Units, and where there is at least one interconnection choice (CHOICE) between any two Allocated Nodes in different AREAs and where an interconnection route comprises two point-to-point interconnections interconnected in series by a STAR Node.

The present network is directed towards the connection of a network of "Points-of-Presence" (PoP). A PoP is a unit used to connect, among other things, to the Internet. Many Internet Service Providers (ISPs) advertised 90% (or greater) local call coverage in the UK, which originally meant that they have PoPs all around the country which can be accessed for the cost of a local telephone call. More recently by dialing one network telephone number and with the use of Intelligent Network call control arrangements, the network will attempt to choose the nearest or most accessible PoP available.

For the present invention, the PoPs or Content Servers, may be ISPs, Video Servers, Call Centres, International Network Interconnection Points, Further Network Connection Points, which may be accessed with the help of Intelligent Network call control arrangements and similar features which it is intended should be readily accessed locally as is practical by subscribers.

According to the present invention there is provided a partially interconnected network having a plurality of Topological Nodes, each Topological Node having at least three direct point-to-point Topological Links connected to other Topological Nodes, each of a proportion of the plurality of Topological Nodes having connected thereat one of a group of Point-of Presence (PoP) Units, said group of PoP Units arranged to provide access to a selected service or services, one or more than one of each at least three direct point-to Point Topological Links from each Topological Node not having connected thereat one of a group of PoP Units connecting to one or more than one of the plurality of Topological Nodes having connected thereat one of the group of PoP Units, there being at least one Choice of routing between any two Topological Nodes, a Choice of routing being either via two Topological Links connected in series at another Topological Node or a direct point-to-point Topological Link between the two Topological Nodes.

The present invention will now be described, by way of example, with reference to the accompanying drawings, in which:

FIGS. 1 to 5 illustrate various basic networks;
FIG. 6 illustrates the terms used herein and in various mathematical books and treatises;
FIGS. 7 to 9 show a number of further networks;
FIG. 10 lists a range of square networks;
FIG. 11 illustrates a network having a group of Content Servers implemented;
FIG. 12 illustrates a network having two groups of Content Servers implemented;
FIG. 13 illustrates a network where the number of Content Servers has been reduced, but still providing cover for all the nodes;
FIG. 14 is a redrawn version of FIG. 12;
FIG. 15 shows the table corresponding to FIG. 14;
FIG. 16 illustrates some of the above figures when constructed using a number of simple transmission rings;
FIG. 17 illustrates a 10-node network;
FIG. 18 is a redrawn version of FIG. 17;
FIG. 19 is a similar figure to FIG. 18;
FIG. 20 lists the smaller intersecting line networks; and
FIG. 21 lists some Strongly Regular Graphs.

Although many classifications of patterns have been identified, several examples of just one particular classification will be used to explain some relevant Partially Interconnected Networks for connecting Core Nodes together as they are some of the simplest to understand, although not necessarily the most efficient.

Nodes which are connected together to form a full mesh are classified as a two stage network, and it is well known that these can easily block when the balance of the loading (on a near fully loaded network) is significantly changed. The number of links can also be rather large as it equates to N(N−1)/2 where N is the number of Nodes.

Instead of all the Nodes in a network being connected to each other to form a full mesh, it is possible that a node is directly connected to just some of the other nodes. Consequently when data has to be passed to a terminating node to which the originating node is not directly connected, then the data has to transit via one of the other nodes. However it will be shown that for a Video Centric Network the traffic can be arranged so that it is not necessary to have to transit via another node, provided that an appropriate Regular Partially Interconnected Network topology is employed.

For example, FIG. 1 shows a network of 16 nodes, where each node is connected to just 6 of the other 15 nodes. Node 1 is directly connected to nodes 2, 3, 4, 5, 9 & 13. The figure also shows the connectivity table for this network.

In order to reach any of the 9 nodes to which node 1 is not directly connected, then it is necessary to transit via one of the other nodes.

FIG. 2 shows two ways of reaching node 7 from node 1. One route is by passing via node 3 and the other is by passing via node 5. There are just two ways of transiting via a single other node in this case. In fact there are always just two ways of transiting via a single node when going between two nodes which are not directly connected together. This regular characteristic is largely because of the regular nature of the structure.

Of course sometimes, in a practical situation, the direct link between nodes may be unavailable or overloaded and an alternative is required.

FIG. 3 highlights the direct link between node 1 and node 4. It also highlights the two alternative ways of reaching from node 1 to node 4 by transiting either via node 2 or via node 3. Again because of the regular nature of this network there are always just two alternative ways of reaching from one node to another node which are directly connected by transiting via just one other node.

Nodes 1, 2, 3 & 4 are each directly connected together to form a small mesh, as are nodes 1, 5, 9 & 13. In fact there are 8 such small meshes in the network FIG. 4 shows each of the 8 meshes as a straight line, and hence simplifies the diagram. This will enable more complex diagrams to be drawn without them being too cluttered. Each complete horizontal or vertical line represents a complete Mesh of 6 links between 4 Nodes.

FIG. 5 has 4 extra lines (the wavy lines) added each representing 4 additional mesh structures. Each node is now directly connected to 9 nodes. By adding the extra connectivity more choices of routes are possible. There are now 6 choices for reaching from node 1 to node 7 via nodes 2, 3, 5, 6, 11 & 13: and there are 4 alternative choices for reaching from node 1 to node 4, via nodes 2, 3, 5 & 16 in addition to the direct link. Each complete horizontal, vertical or wavy line represents a complete Mesh of 6 links between 4 Nodes.

FIG. 6 explains the terms, including Choices, used in this description and the corresponding mathematical terms, such as are used in "The CRC Handbook of Combinatorial Design", C. J. Colbourn and J. H. Dinitz (Eds.), CRC Press, Boca Raton, Fla., 1966.

16 is a perfect square and similar characteristics apply to other perfect squares, such as 25.

FIG. 7 shows 25 nodes each connected to 8 other nodes, with 2 Choices for indirect paths and a total of 4 choices between directly connected nodes. The figure also shows the connectivity table for this network. Each complete horizontal or vertical line represents a complete Mesh of 10 Links between 5 Nodes.

FIG. 8 again shows 25 nodes, but now with each connected to 12 other nodes, with 6 Choices for indirect paths and a total of 6 choices between directly connected nodes. The figure also shows the connectivity table for this network. Each complete horizontal, vertical or wavy line represents a complete Mesh of 10 Links between 5 Nodes.

FIG. 9a shows 36 nodes each connected to 10 other nodes, with 2 Choices for indirect paths and a total of 5 choices between directly connected nodes. FIG. 9b also shows another 36 nodes, but now with each node connected to 15 other nodes, with 6 Choices for indirect paths and a total of 7 choices between directly connected nodes. Each complete horizontal, vertical or wavy line represents a complete Mesh of 15 Links between 6 Nodes.

FIG. 10 lists the characteristics of a range of perfect square networks where at least two patterns can be drawn for each value of N, where N is a square of an integer number.

Various growth methods have been investigated and one is by adding a row of nodes. This is initially very straightforward, but some reconnections (of the diagonals) for the patterns with 6 Choices of indirect paths occur when adding a column of (N+1) nodes. Having added a row of N nodes and a column of (N+1) nodes the pattern is the next perfect square up, and the growth process could start again.

Because of the regular nature of the perfect square patterns it is possible to further exploit their characteristics for Video Centric type applications. So that the diagram is not too large the following will be explained using a 25 node network. It is clearly not practical to have all content available at all nodes. It is also not desirable to have to transit via another node in order to reach the content of another node.

FIG. 11 shows Replica "A" Content Servers attached to just 5 of the nodes, namely nodes 5, 9, 13, 17 & 21. The same content is directly available at each of those 5 nodes.

Remembering that a line represents a small fill mesh; then for each of the other 20 Nodes there is always a direct path to exactly 3 of the Replica "A" Content Servers. This is highlighted for Node 2 which is directly connected to nodes 5, 17 & 21 which each have a Replica "A" Content Sever. A further set (or sets) of Replica Content Servers can be added.

FIG. 12 shows a second set of Content Servers namely Replica "B" which have been attached to nodes 3, 7, 11, 20 & 24. By attaching Replica sets of Content Servers in a complementary manner to the Partially Interconnected Network, some very effective structures can be achieved.

By using Partially Interconnected Networks the choices of routing are deliberately restricted. This has advantages, as too many alternative routes leads to thinner routes, more transmission systems, more switch ports used and longer path hunting times. Regular Partially Interconnected Networks are much easier to dimension especially when allowing for the extra capacity needed to cover for the non availability of some of the equipment. The loss of a link or a node is very easy to simulate and the effect is much the same regardless of which link is lost, especially if all the links have similar characteristics. When faults, or unusual events occur the effect of spreading the extra load widely and quite uniformly across the rest of the nodes is a fascinating feature of Regular Partially Interconnected Networks. Appropriate path selection algorithms may be chosen in order to minimise the risk of overloading links.

FIG. 13 shows that it is possible to obtain cover of all the nodes in a 5×5 Node network having just 3 PoPs of Content Servers:

4 Nodes without a PoP are directly connected to 3 Nodes with a PoP;

6 Nodes without a PoP are directly connected to 2 Nodes with a PoP;

12 Nodes without a PoP are directly connected to 1 Node with a PoP.

To indicate which Nodes are connected to which PoP or PoPs, each Node has an indicator on its circumference at the position of Content Server X on Node 11, Content Server Y on Node 3 or Content Server Z on Node 19, as appropriate. This arrangement does not give a regular distribution of connections and makes provisioning for fault and overload conditions much less efficient. This example has nodes connected to 12 other nodes. In FIG. 7, where the nodes are connected to only 8 others, the full diagonal of 5 Content Servers would be required to give all nodes without a Content Server access to a node with a Content Server.

FIG. 14 is a redrawn version of FIG. 12 with the Content Servers arranged in horizontal groups, but with the numbering of the 25 nodes in the same positions, this results in the lines, which represent meshes, being rather cluttered.

FIG. 15 shows the table corresponding to FIG. 14 which has 5 blocks of 5×5 without any entries. This is because a group of Content Servers do not need direct connections between them. Hence one of the advantages of this network structure is that such connections do not exist. Groups of Content Servers are arranged horizontally. There are no direct connections between the nodes hosting a group of Content Servers.

Another possibility that results from the regular nature of the described Partially Interconnected Networks, is the exploitation of the fact that the overall network is constructed from several small mesh networks. It is possible to use a transmission ring as a means of producing a small mesh network. For example a 4 node ring carrying 6 wavelengths can be used to create a full mesh between the 4 nodes.

FIG. 16 is very similar to some earlier figures, but it has been drawn so as to highlight the possibility of it being constructed from 8 simple transmission rings. The rings being;

1,2,3,4;
5,6,7,8;
9,10,11,12;
13,14, 15,16;
1,5,9,13;
2,6,10,14;
3,7,11,15;
4,8,12,16.

All the Partially Interconnected Networks described here could be constructed this way provided ring limits are not exceeded. The large 100 node network would need 30 rings each of 10 nodes and 45 wavelengths (if using WDM).

Other network types, which are not based on perfect squares, can also be used.

Figure 1:
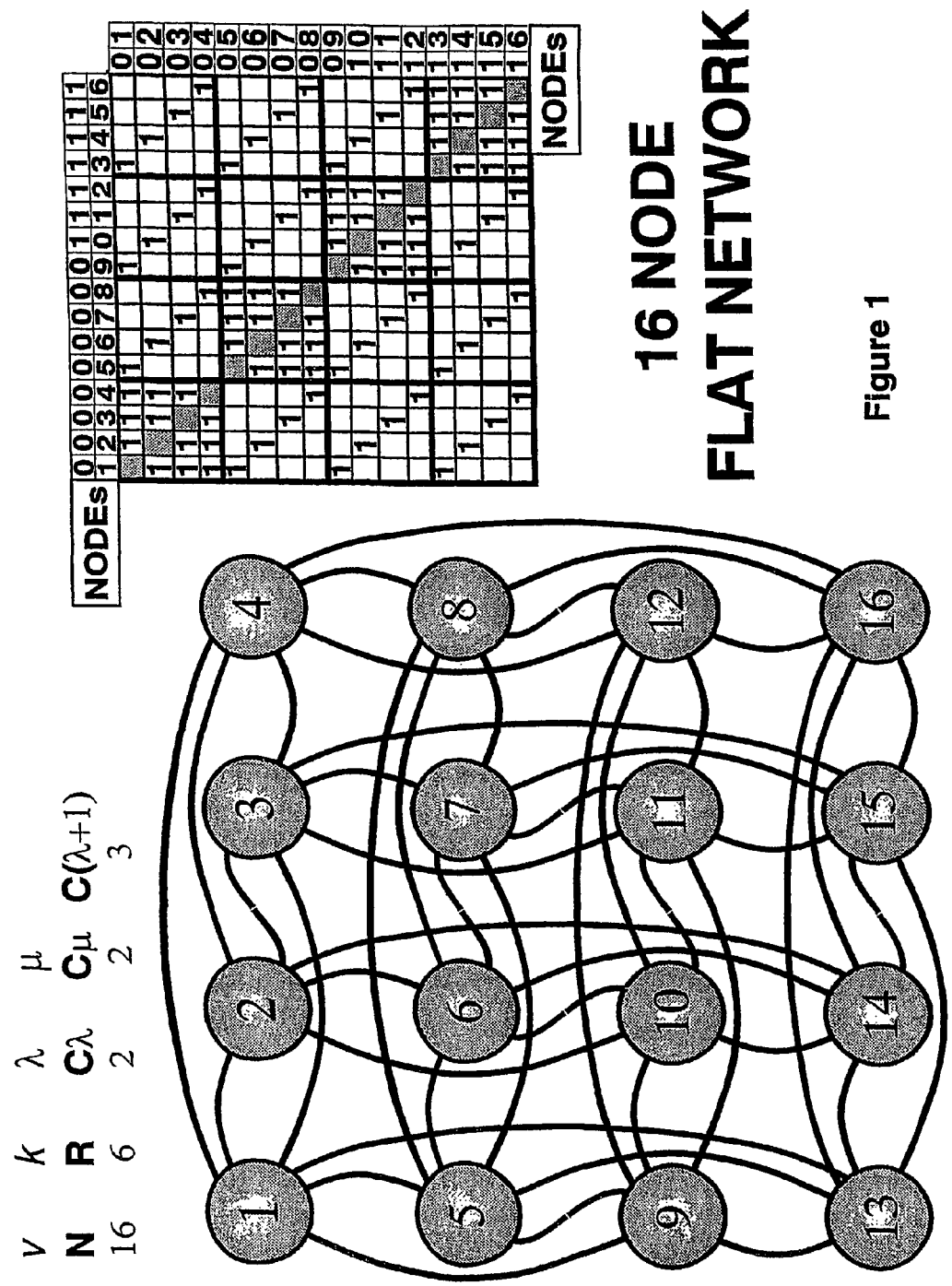
Figure 2:
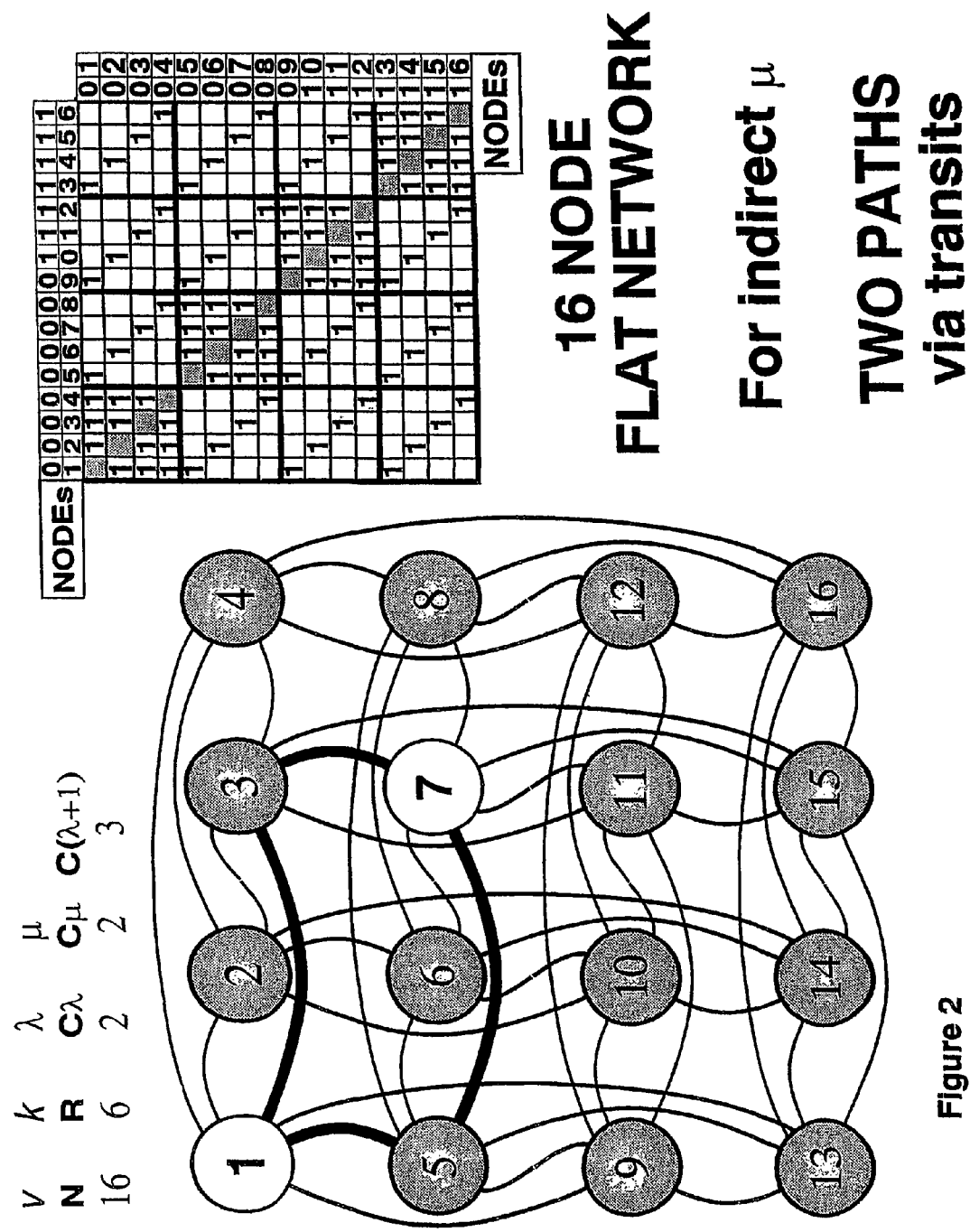
Figure 3:
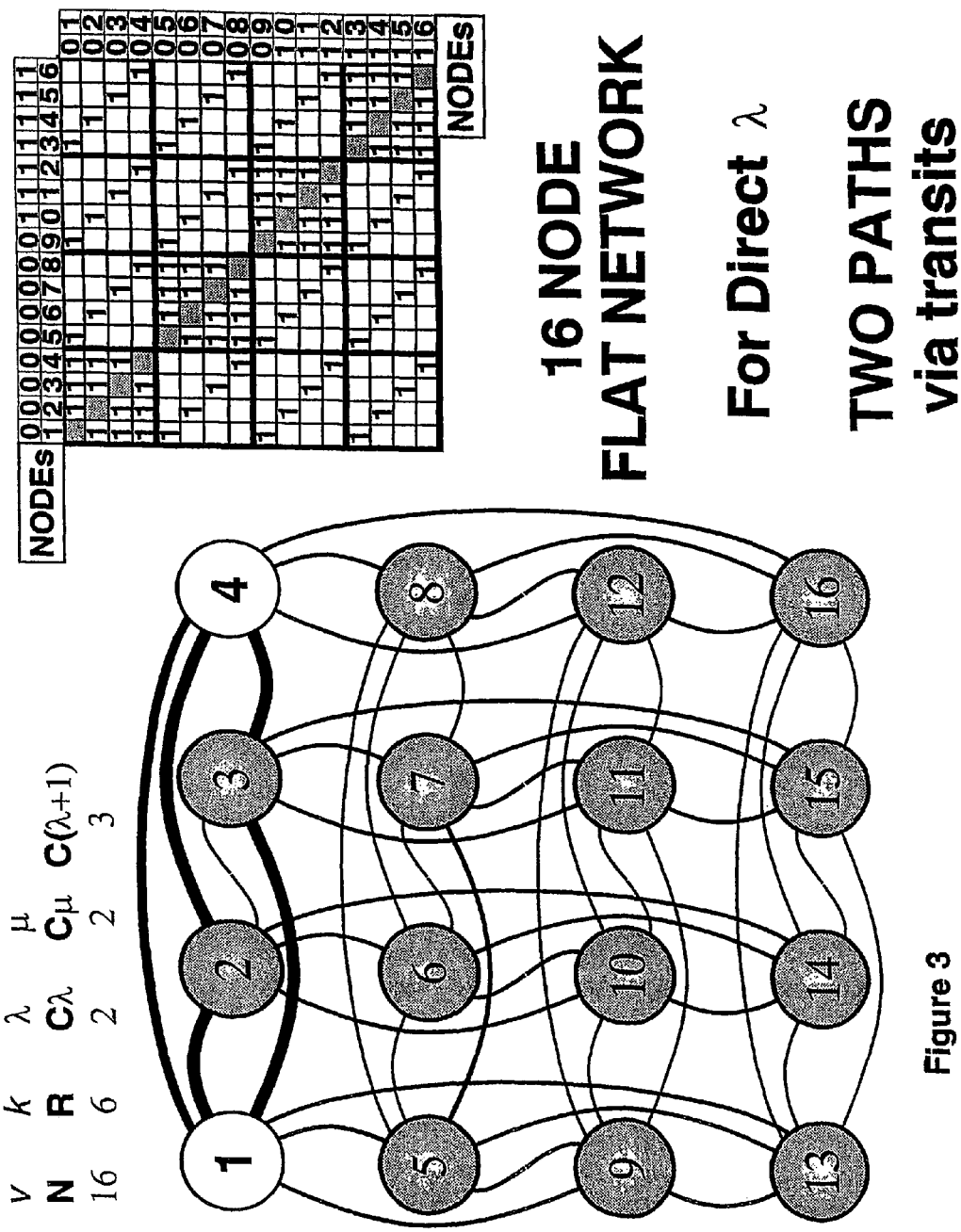
Figure 4:
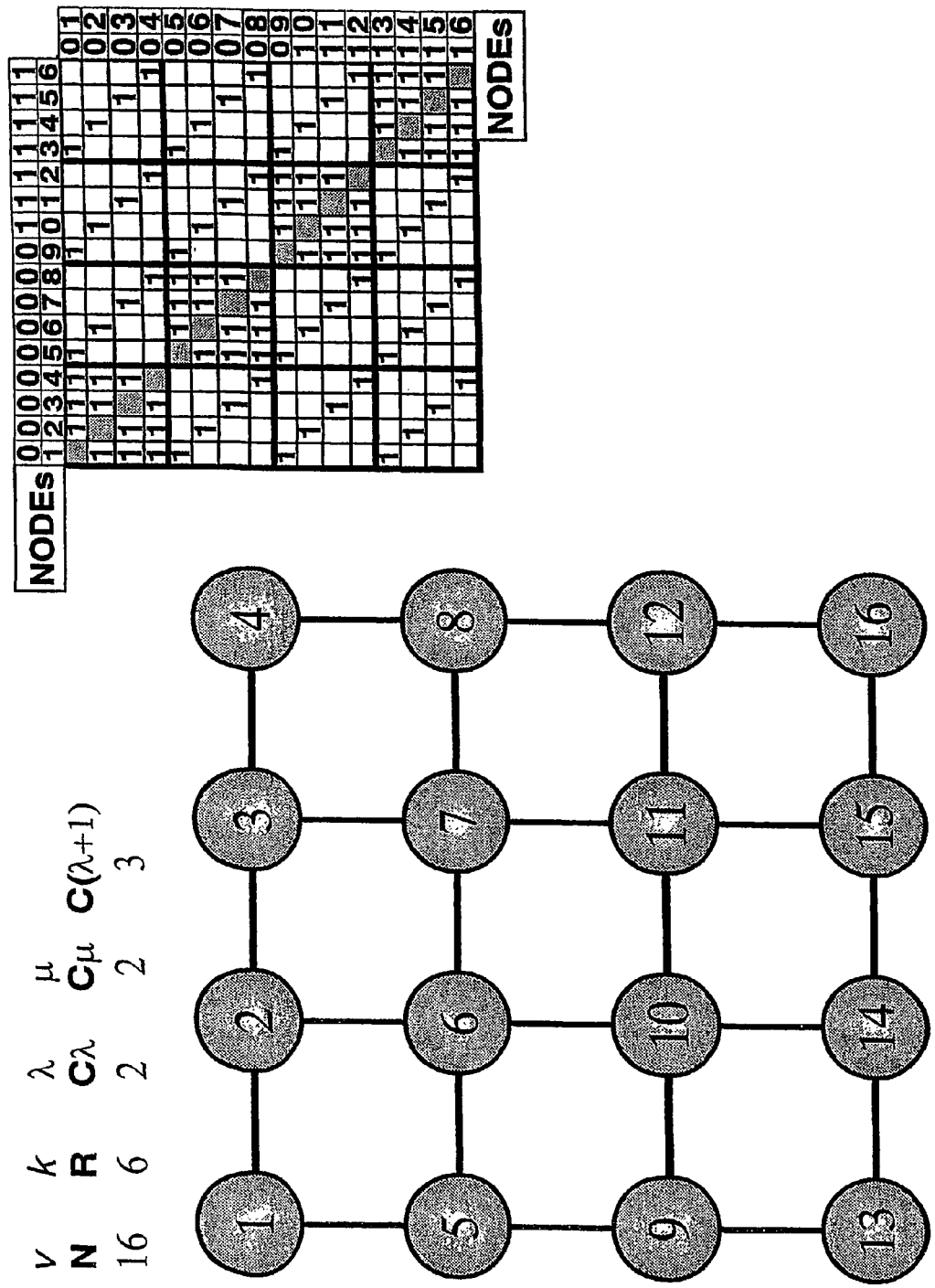
Figure 5:
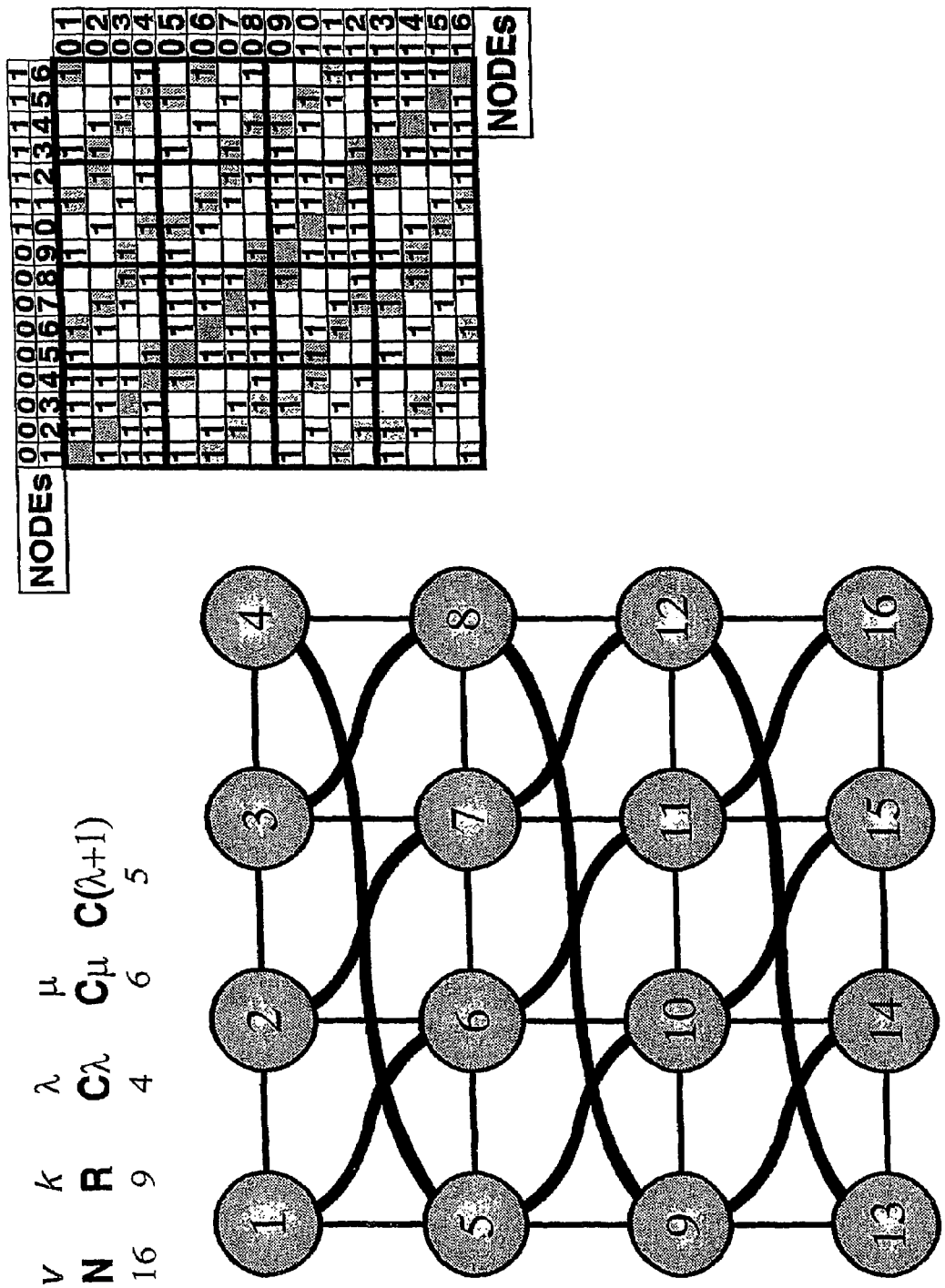
Figure 6:
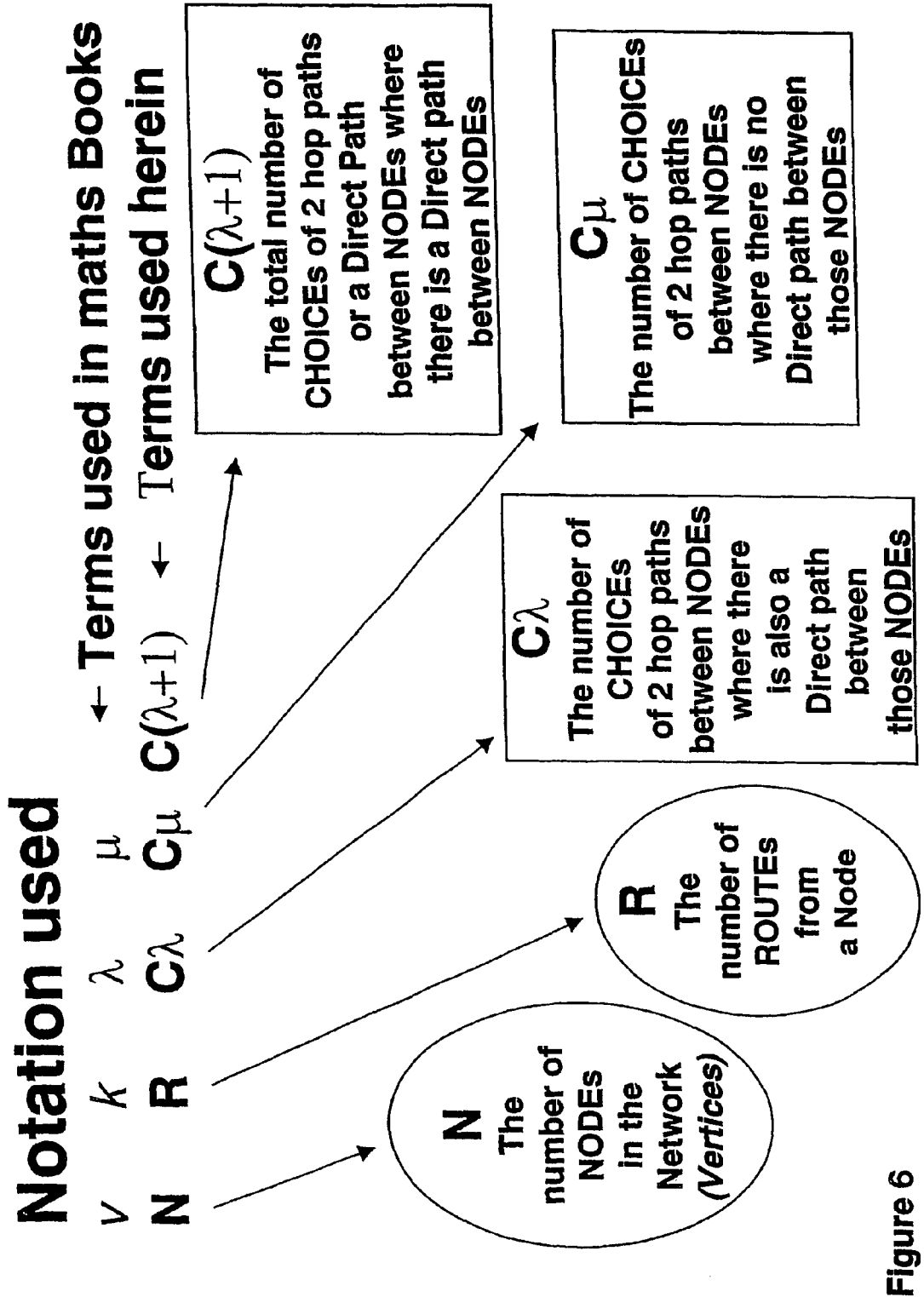
Figure 7:
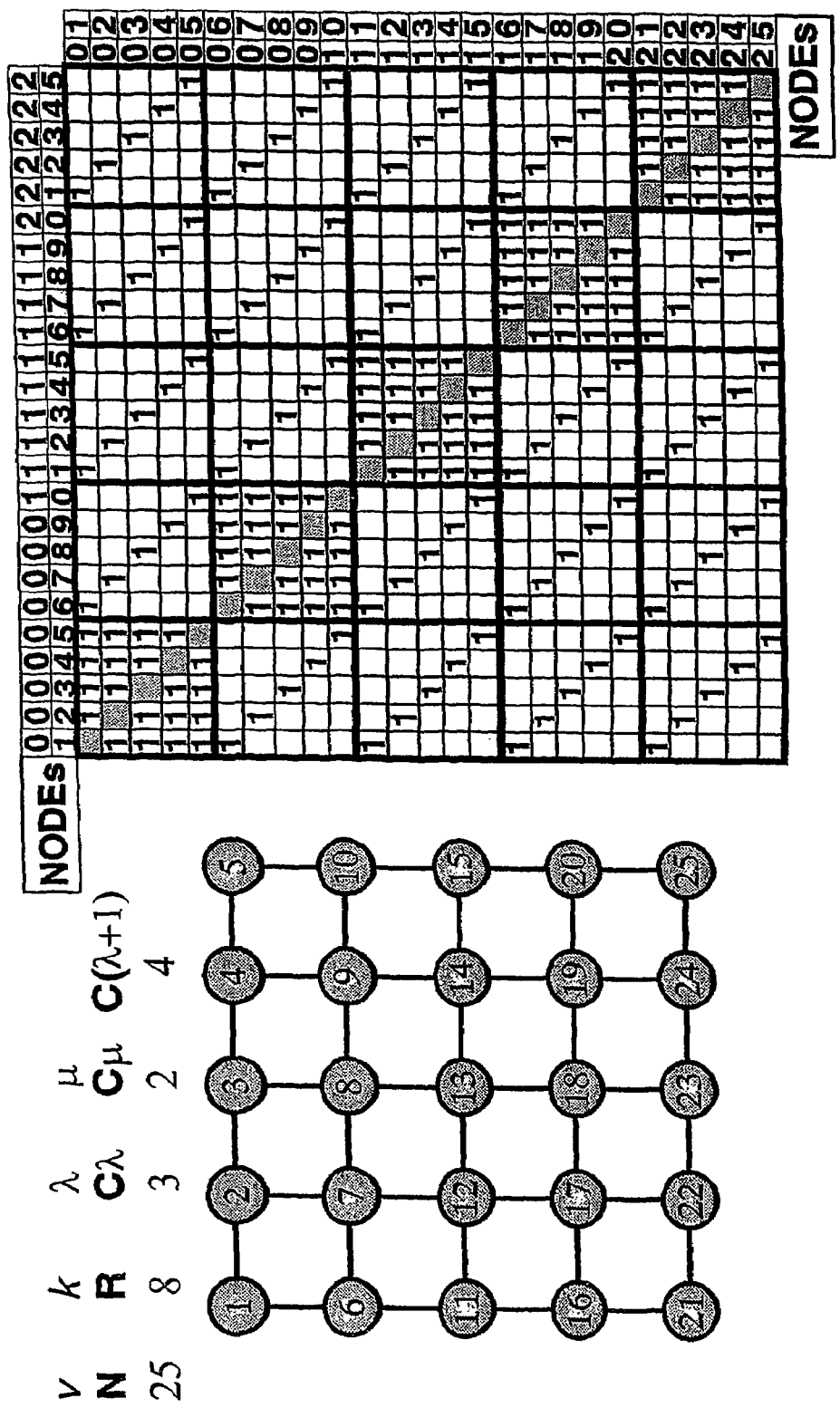
Figure 8:
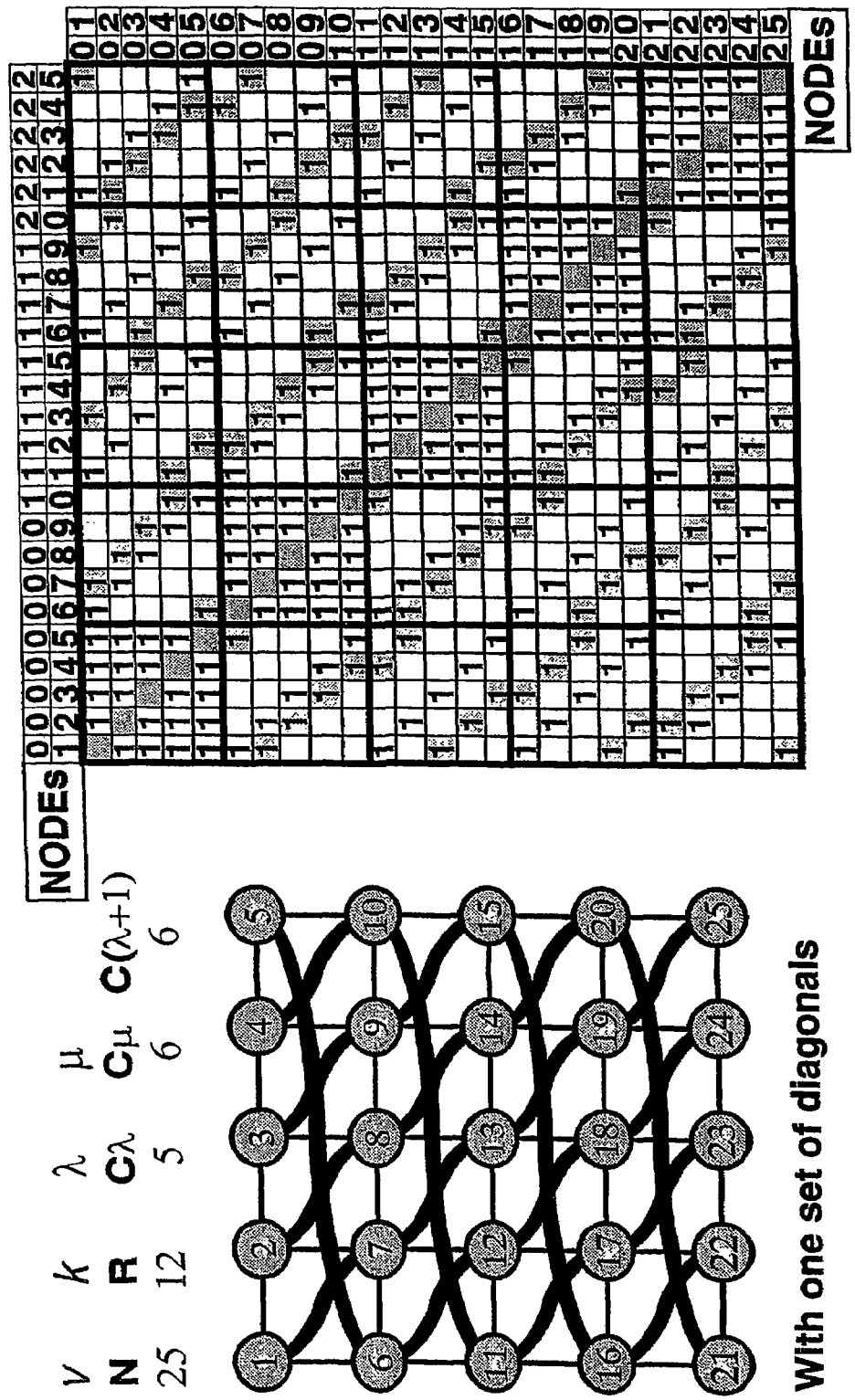
Figure 9B:
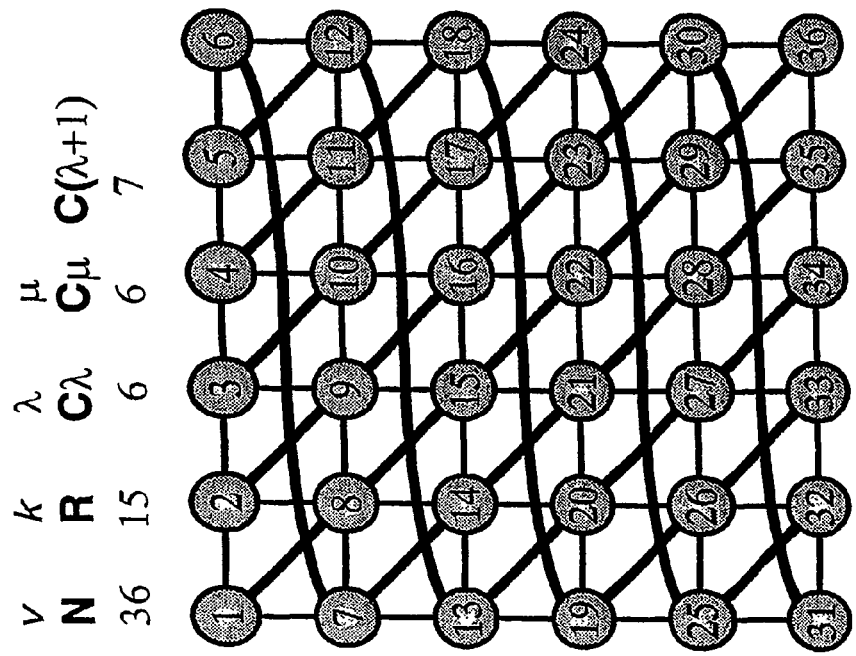
Figure 9A:
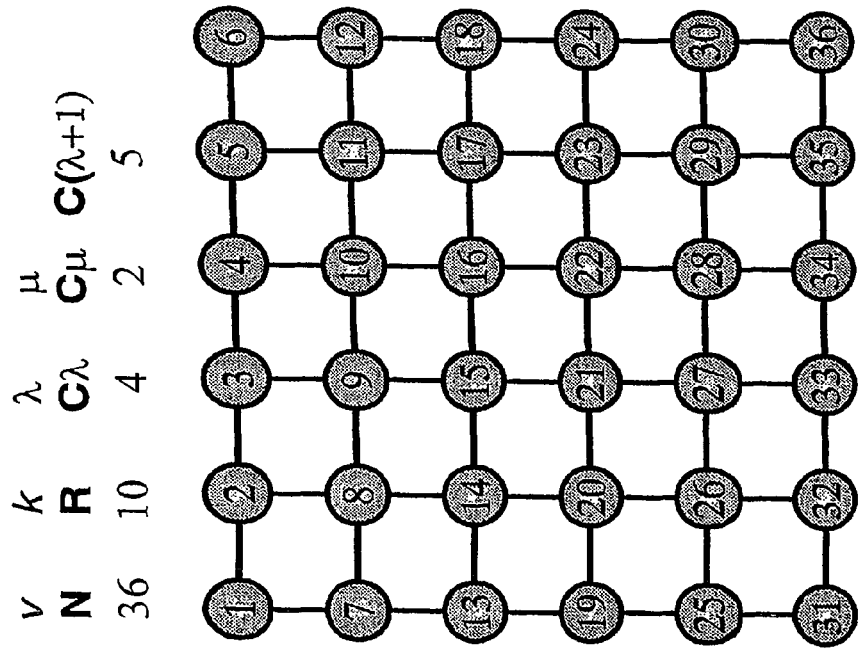
Figure 11:
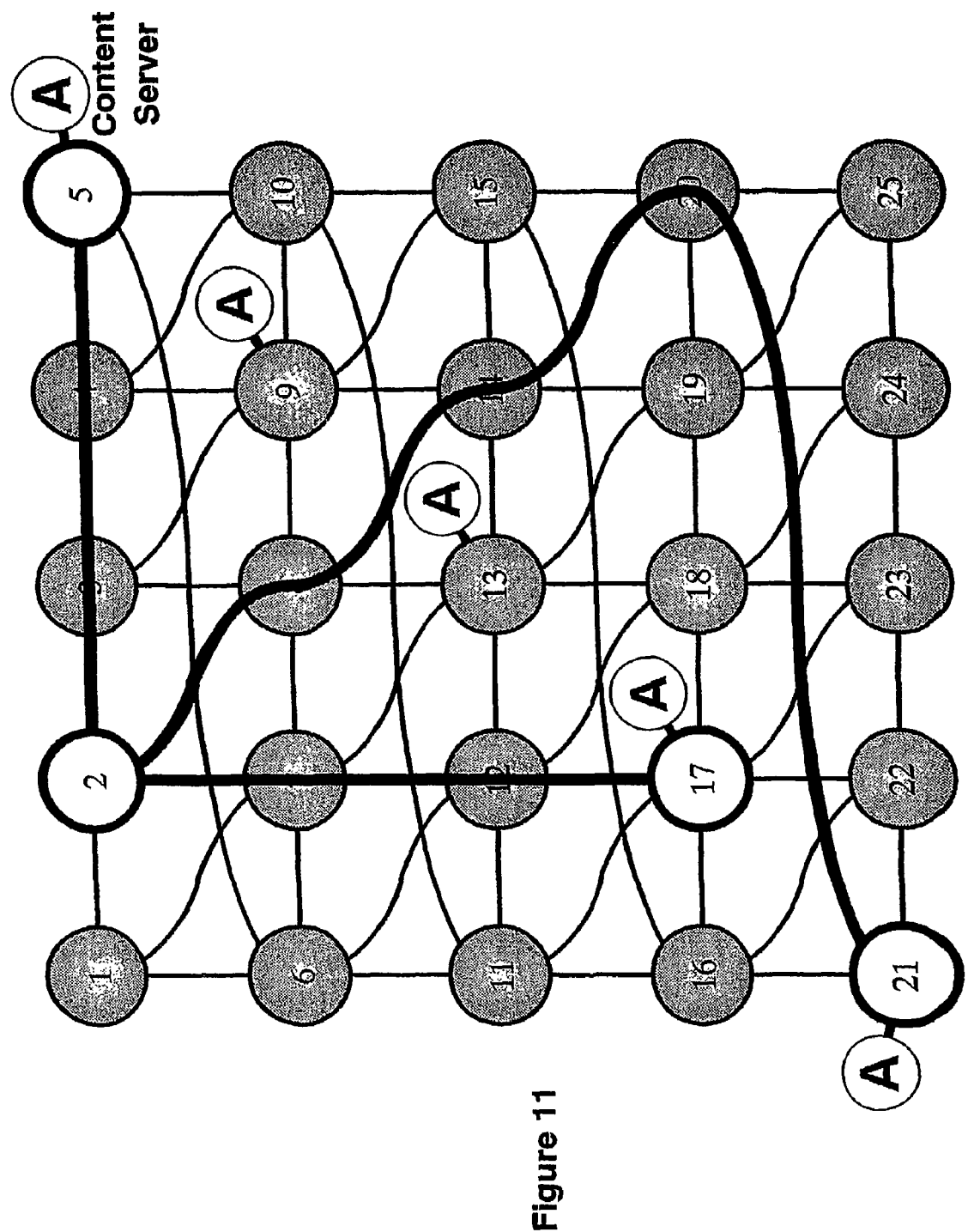
Figure 12:
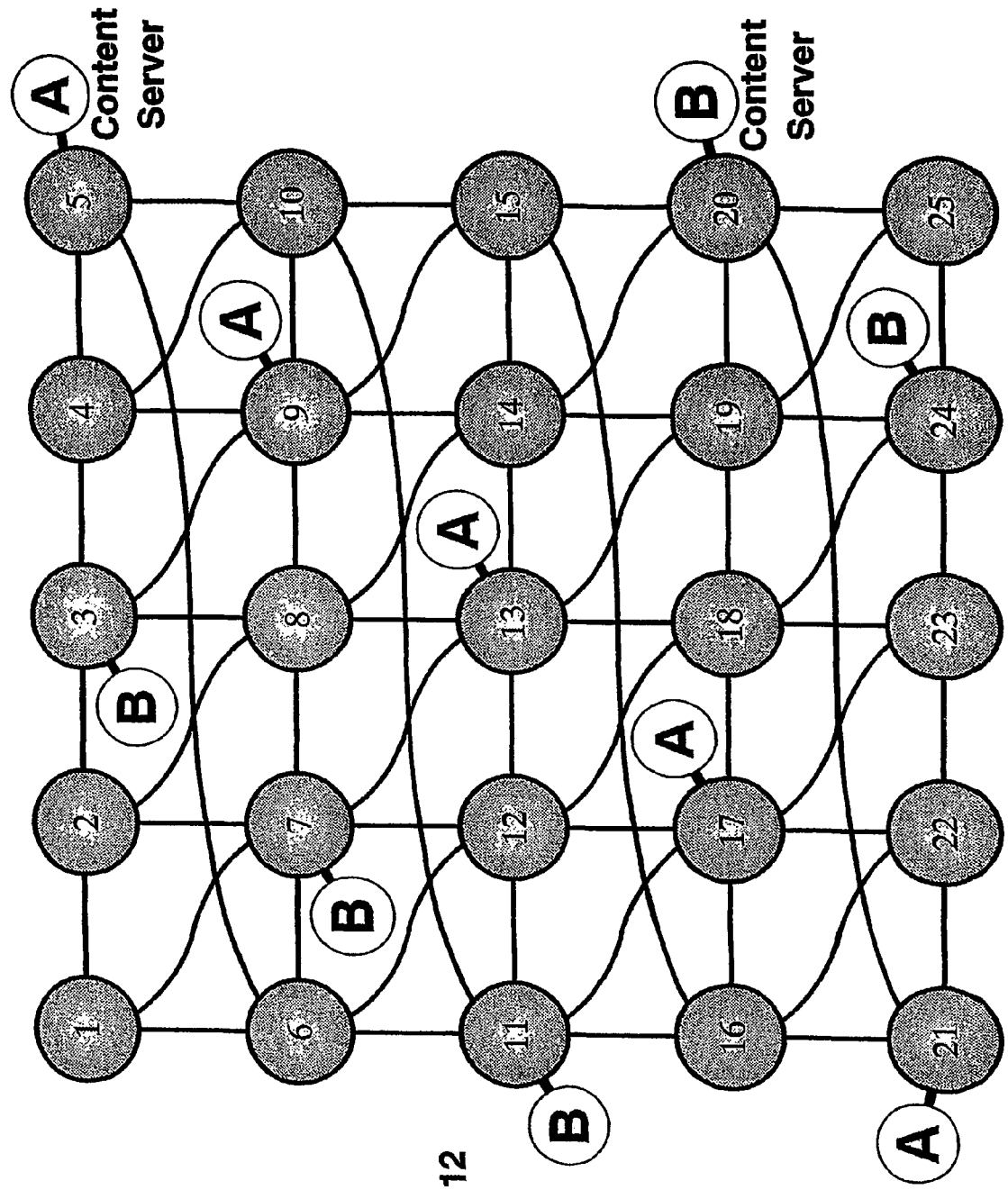
Figure 13:
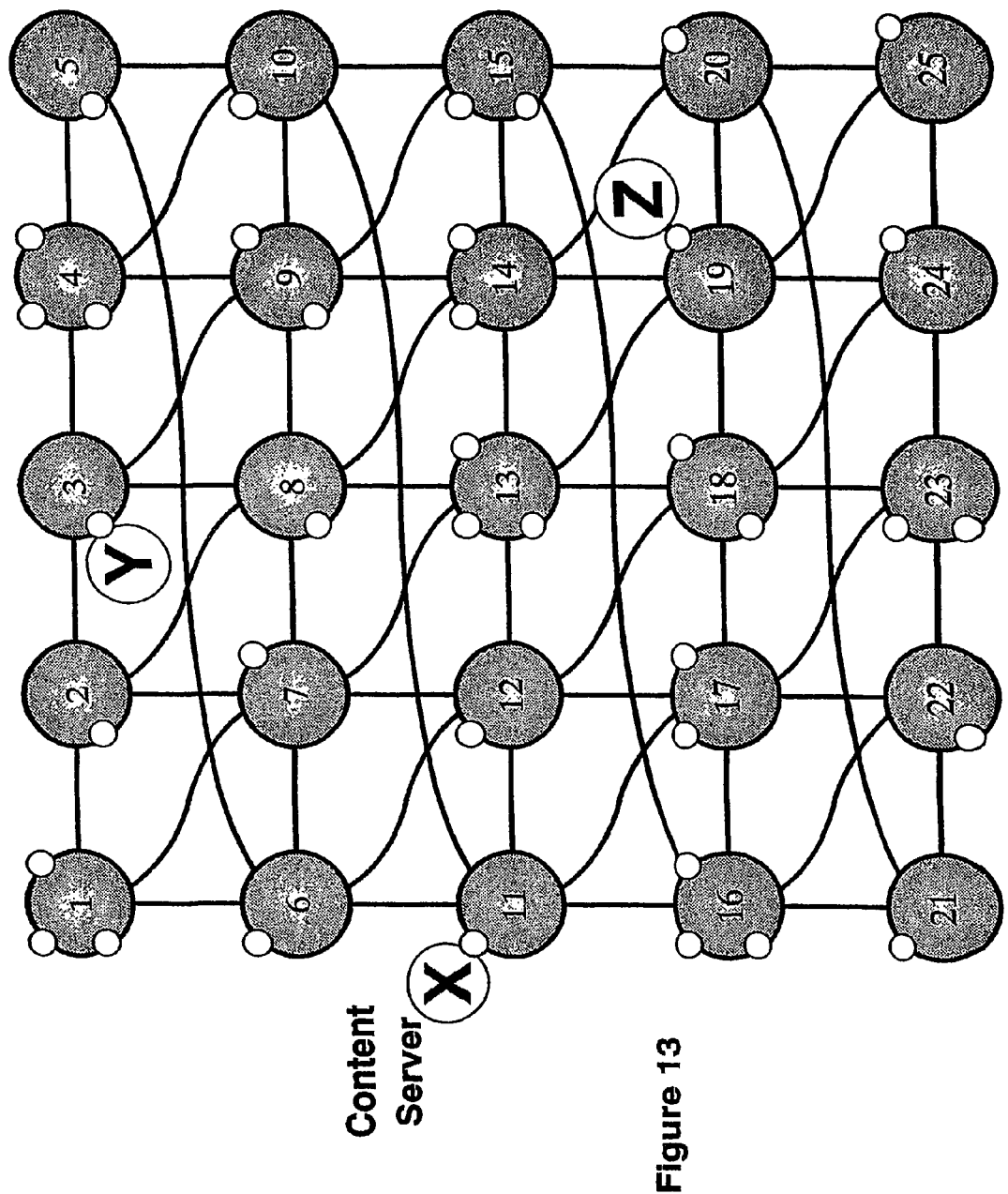
Figure 14:
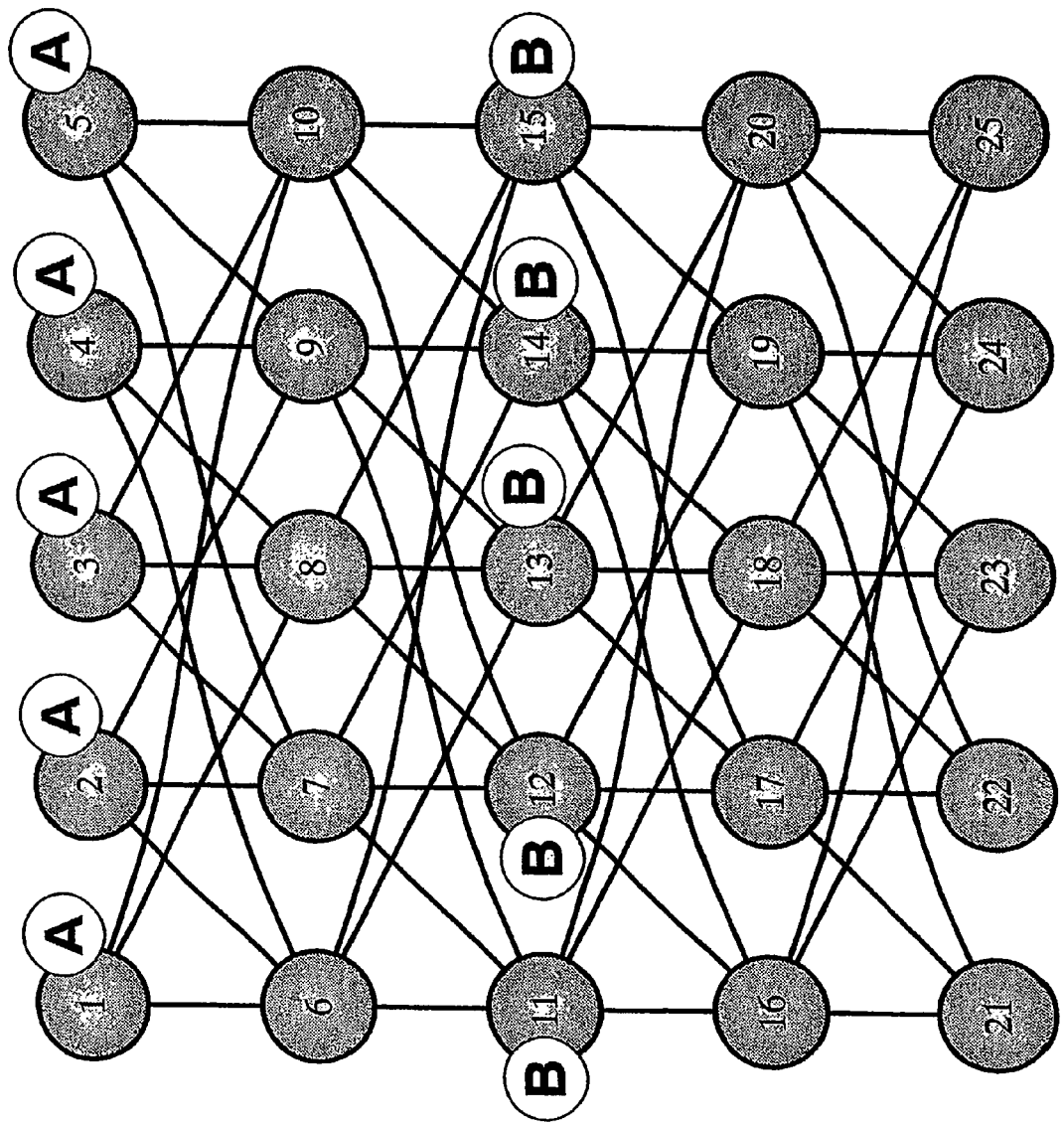
Figure 15:
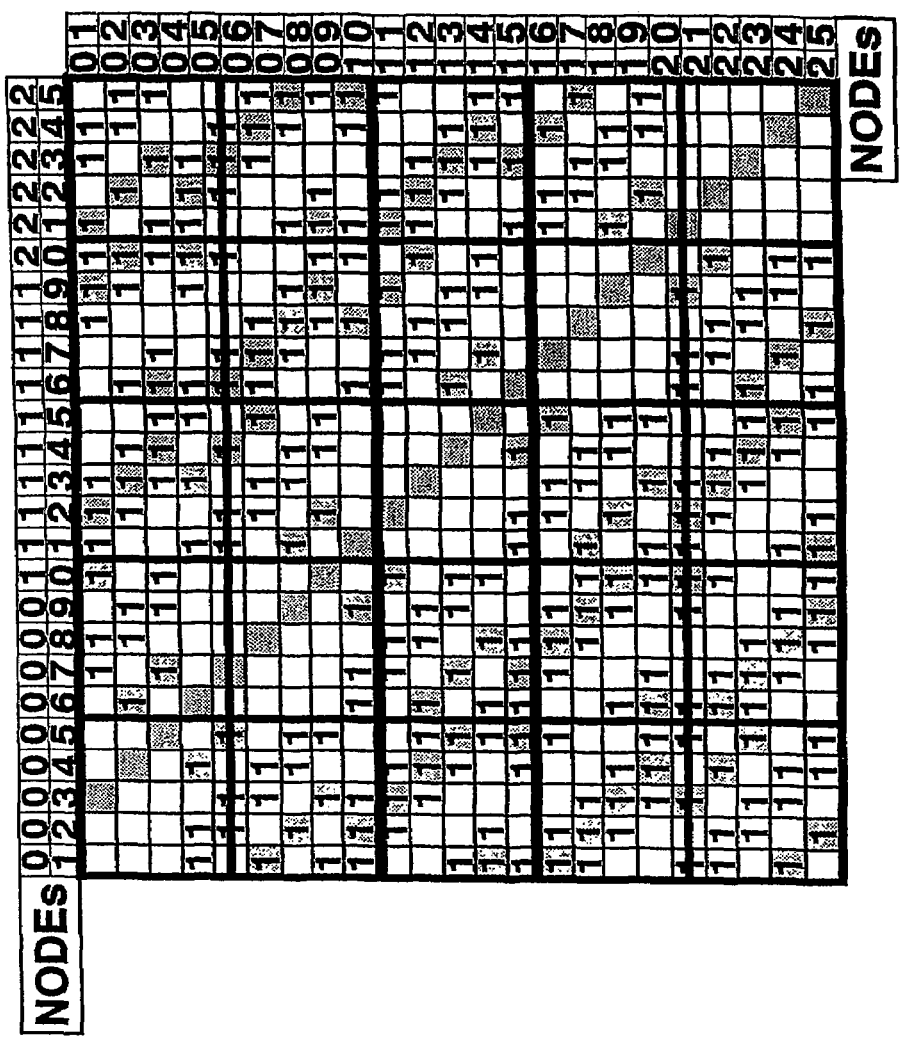
Figure 16:
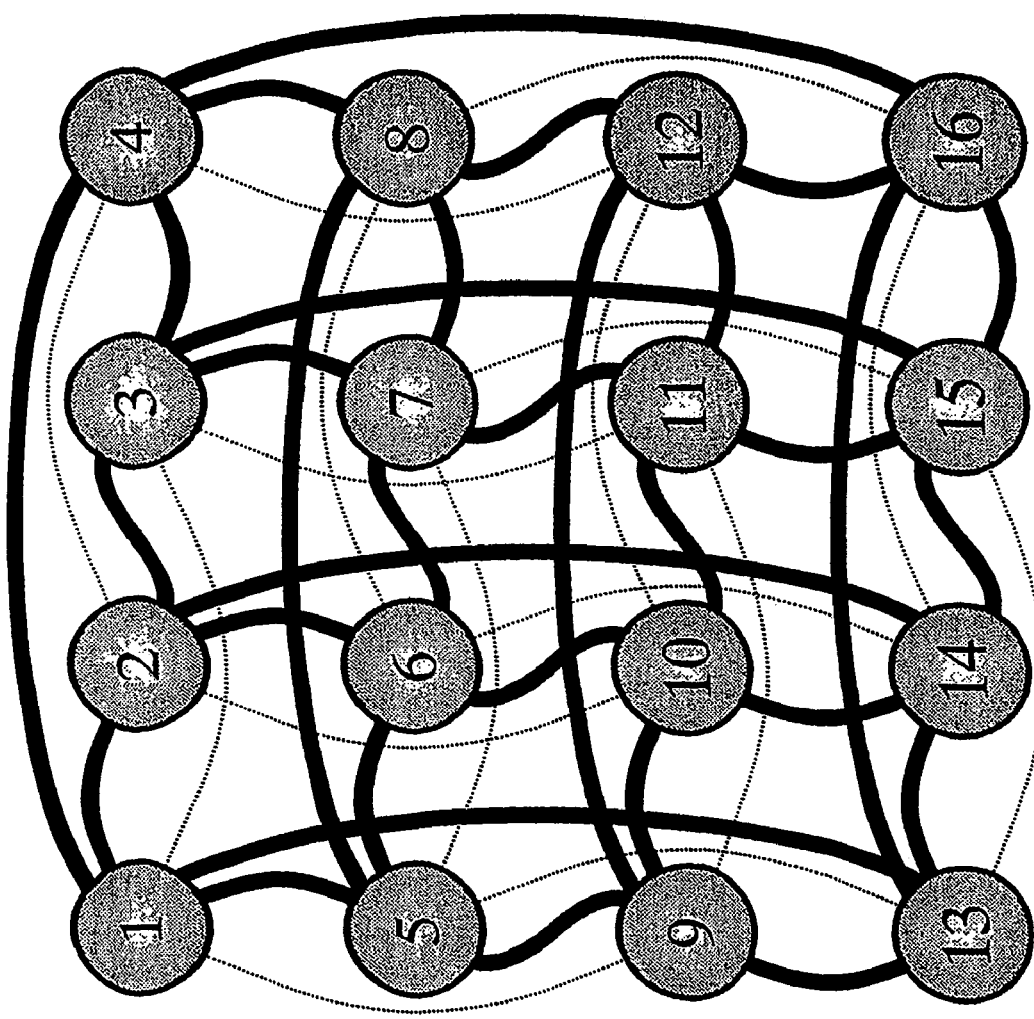
Figure 17:
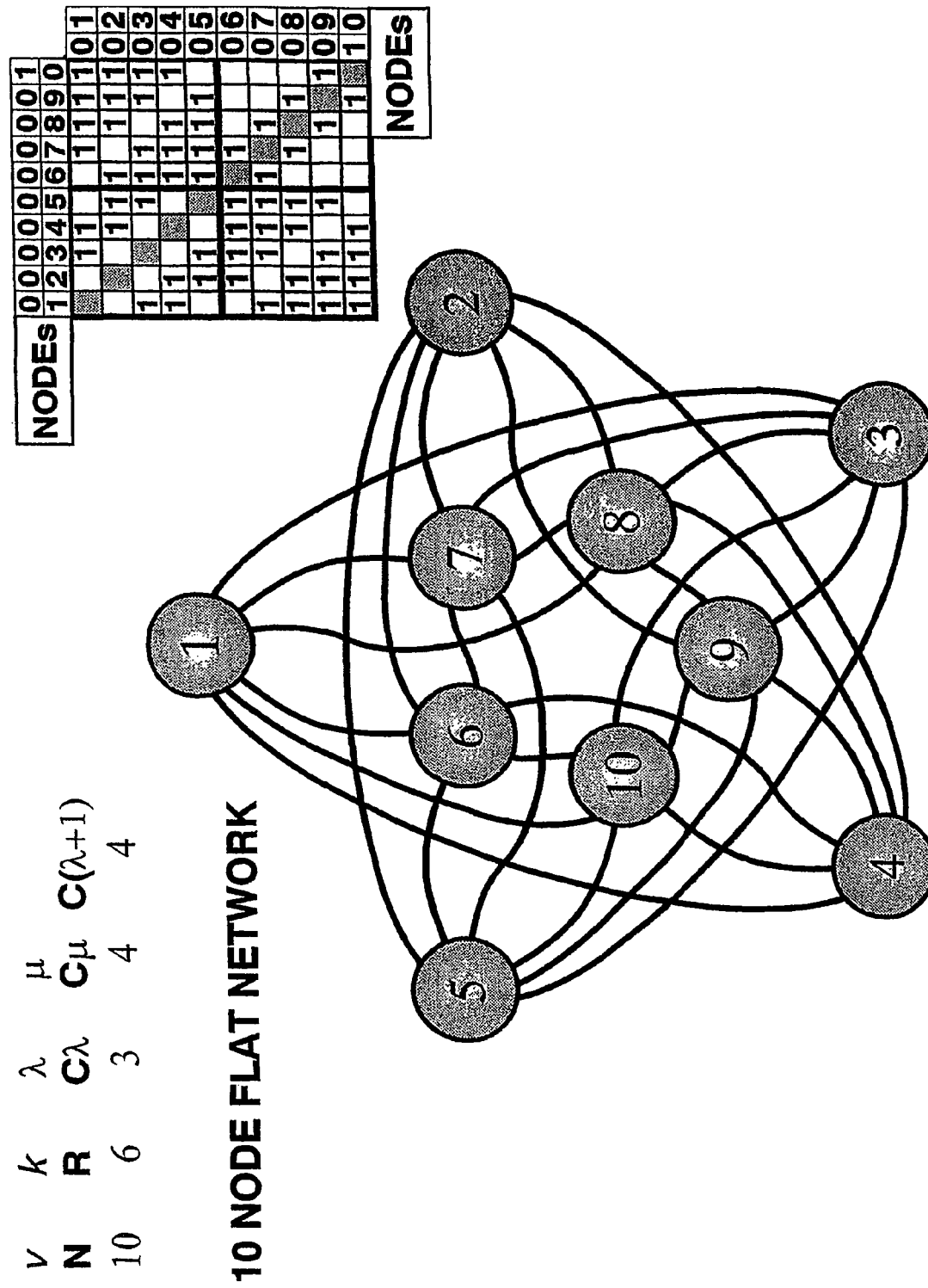
FIG. 17 is a 10 node network, where each node is connected to 6 of the other nodes. Nodes 5, 6, 7 & 2 are connected together as a small mesh, as are 4 other groups of 4 nodes.
Figure 18:
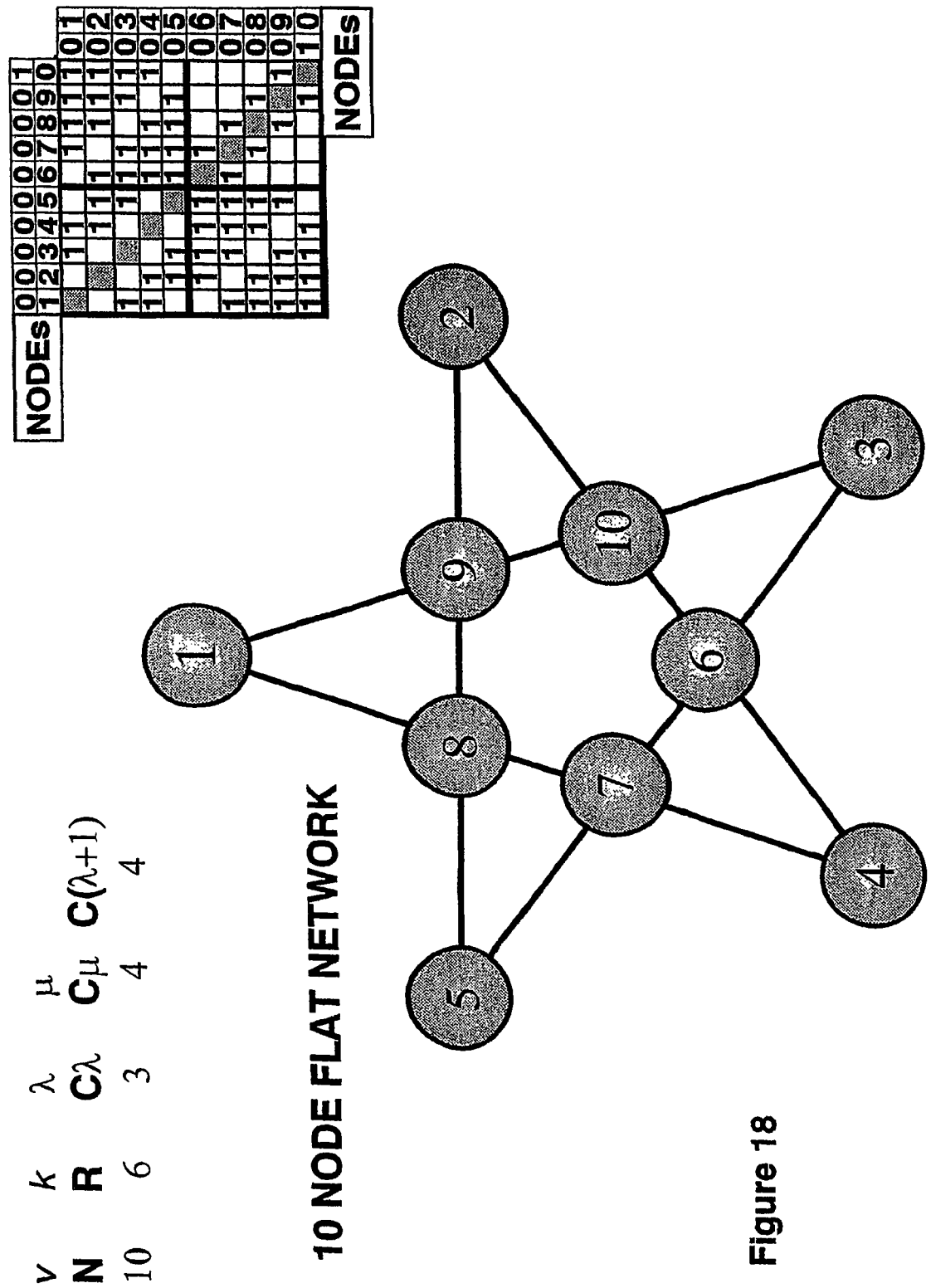
FIG. 18 is the same as FIG. 17 except that each of the 5 small meshes is shown as a line. This network can be described as an intersecting line network.
Figure 19:
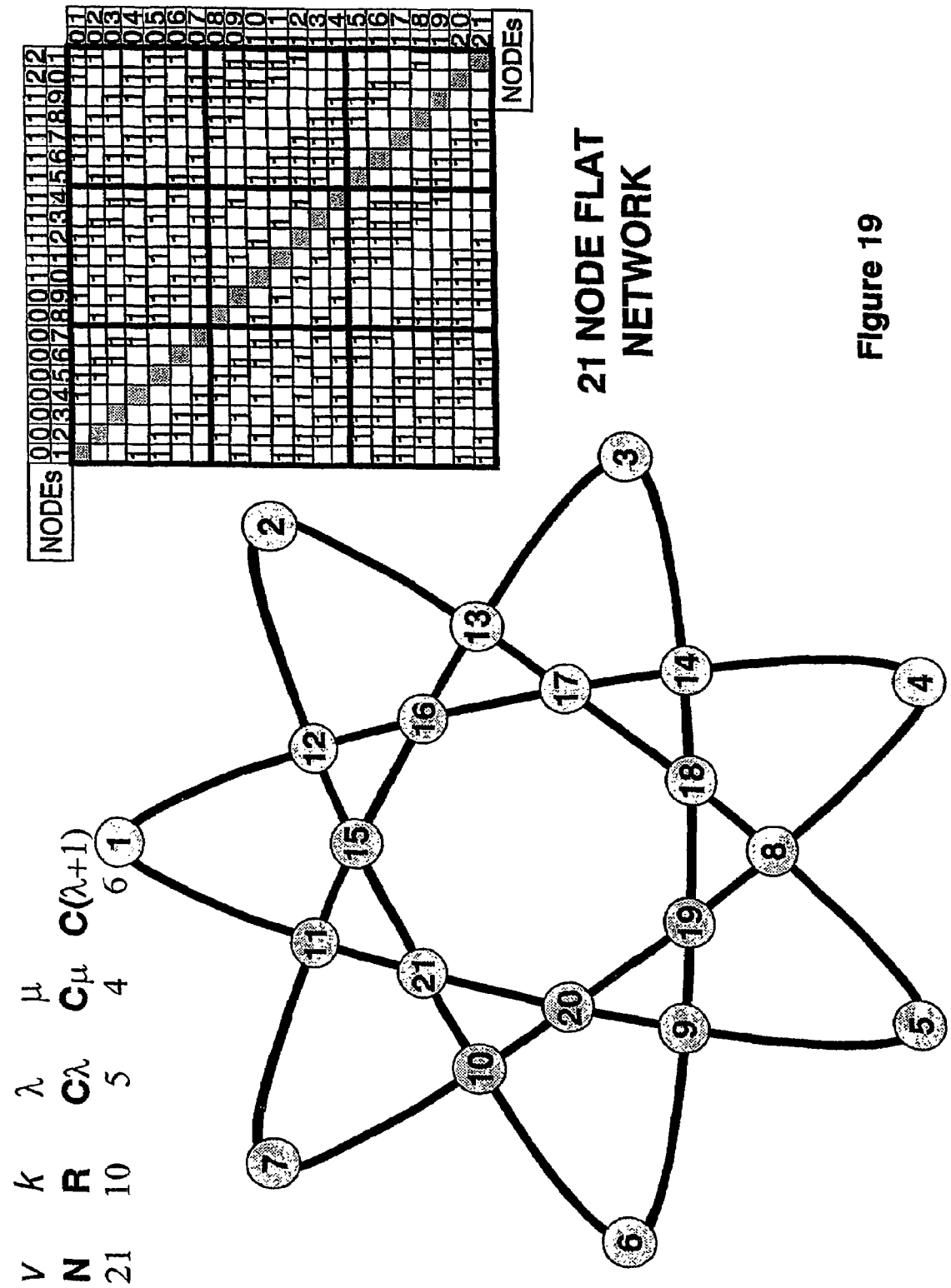
FIG. 19 is a similar figure to FIG. 18 except that instead of 5 lines there are 7 lines, with each line representing a mesh. The connectivity table is also shown.

FIG. 19 could have a Group of Content Servers attached to nodes 1, 2, 3, 4, 5, 6 and 7. This results in all the other 14 nodes being able to access 4 of these Content Servers via direct connections. Other groups could be attached to Nodes 8, 9, 10, 11, 12, 13 and 14 and Nodes 15, 16, 17, 18, 19, 20 and 21. Unlike the Perfect Square Networks, with Intersecting Line Networks there are some direct connections, between Nodes with Content Servers of the same Group.

FIG. 20 lists the smaller Intersecting Line Networks with Multiple Choice SRGs based on intersecting lines with $\mu=4$.

Strongly Regular Graphs (SRGs) are a suitable way of defining a connectivity pattern for Partially Interconnected Networks with multiple Nodes. Some further multiple choice SRGs that are known to be able to have PoPs attached in a regular manner are listed in FIG. 21.

The invention claimed is:

1. A partially interconnected network, comprising: a plurality of topological nodes, each topological node having at least three direct point-to-point topological links connected to other topological nodes, some, but not all, of the plurality of topological nodes having connected thereat one of a group of point of presence (PoP) units, said group of PoP units being arranged to provide access to a selected service or services, one, or more than one, of each of the at least three direct point-to-point topological links from each topological node not having connected thereat one of a group of PoP units connecting to one, or more than one, of the plurality of topological nodes having connected thereat one of the group of PoP units, and at least one choice of routing between any two topological nodes, the choice of routing being either via two topological links connected in series at another topological node or a direct point-to-point topological link between the two topological nodes, there being no direct connection between the PoP units in said group of PoP units.

2. The partially interconnected network as claimed in claim 1, wherein each of a proportion of the plurality of topological nodes has connected thereat one of a further group of PoP units arranged to provide access to a further selected service or further selected services, one, or more than one, of each of the at least three direct point-to-point topological links from each topological node not having connected thereat one of a further group of PoP units connecting to one, or more than one, of the plurality of topological nodes having connected thereat one of the further group of PoP units.

3. The partially interconnected network as claimed in claim 2, wherein at least one of the selected service, services, further selected service and further selected services is chosen from an internet service provider (ISP), a video source, a call center, an international network interconnection point, a further network interconnection point, or an intelligent network server, any of which is accessible with the help of intelligent network call control arrangements.

4. The partially interconnected network as claimed in claim 1, wherein all the topological nodes not having connected thereat one of a particular group of PoP units are each directly connected via direct point-to-point topological links to an equal number of topological nodes having connected thereat one of that particular group of PoP units.

* * * * *

UNITED STATES PATENT AND TRADEMARK OFFICE
CERTIFICATE OF CORRECTION

| | |
|---|---|
| PATENT NO. | : 7,487,263 B2 |
| APPLICATION NO. | : 10/470204 |
| DATED | : February 3, 2009 |
| INVENTOR(S) | : Chopping et al. |

It is certified that error appears in the above-identified patent and that said Letters Patent is hereby corrected as shown below:

In Column 4, Line 36, delete "fill" and insert -- full --, therefor.

In Column 6, Line 7, delete "connections," and insert -- connections --, therefor.

Signed and Sealed this

Twentieth Day of October, 2009

David J. Kappos
*Director of the United States Patent and Trademark Office*